(12) United States Patent
Chun (10) Patent No.: US 7,317,909 B2
(45) Date of Patent: Jan. 8, 2008

(54) SYSTEM AND METHOD FOR PROVIDING REAL-TIME SEARCH INFORMATION

(75) Inventor: Kyong-Joon Chun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 644 days.

(21) Appl. No.: 10/803,680

(22) Filed: Mar. 18, 2004

(65) Prior Publication Data

US 2004/0229611 A1    Nov. 18, 2004

(30) Foreign Application Priority Data

May 12, 2003    (KR)    ...................... 10-2003-0029885

(51) Int. Cl.
*H04Q 7/22*    (2006.01)
(52) U.S. Cl. .............................. 455/414.1; 455/456.3; 455/566
(58) Field of Classification Search ............. 455/414.2, 455/456.3, 552.1, 556.1
See application file for complete search history.

(56) References Cited

U.S. PATENT DOCUMENTS

2002/0071677 A1 * 6/2002 Sumanaweera ............. 396/429
2005/0185060 A1 * 8/2005 Neven ...................... 348/211.2

* cited by examiner

*Primary Examiner*—Temica Beamer
(74) *Attorney, Agent, or Firm*—The Farrell Law Firm, PC (57) ABSTRACT

A system is provided for providing real-time search information, which comprises a mobile terminal for transmitting by radio a signal requesting detailed information about multimedia data and outputting detailed information received by radio in response to the request; a search system comprising an information database storing relevant information about multimedia data, checking whether any information in the information database matches multimedia data, about which detailed information has been requested, sending a signal requesting detailed information corresponding to the matching information, if any, and when the requested detailed information is received, transmitting the received detailed information to the mobile terminal; and a plurality of information providing servers for collecting detailed information corresponding to the matching information upon receiving a signal requesting the detailed information from the search system, and sending the collected information to the search system.

16 Claims, 5 Drawing Sheets

SYSTEM AND METHOD FOR PROVIDING REAL-TIME SEARCH INFORMATION

PRIORITY

This application claims priority to an application entitled "System and Method for Providing Real-Time Search Information" filed in the Korean Intellectual Property Office on May 12, 2003 and assigned Ser. No. 2003-29885, the contents of which are incorporated herein by reference.

BACKGROUND OF THE INVENTION

1. Field of the Invention

The present invention relates to a system and a method for providing search information in real time, and more particularly to a system and a method for optimizing detailed information corresponding to an image photographed by a camera provided in a mobile terminal and/or a sound recorded by a mobile terminal and providing the optimal information to a user.

2. Description of the Related Art

Generally, mobile terminals are handheld devices for performing wireless communication with a base station and providing wireless communication services to users. Such mobile terminals have rapidly become popular worldwide as a necessity among people of different sexes and ages. A mobile terminal essentially comprises a transceiver for transmitting and receiving voice or image data, a data input/output section and an antenna.

Figure 1:
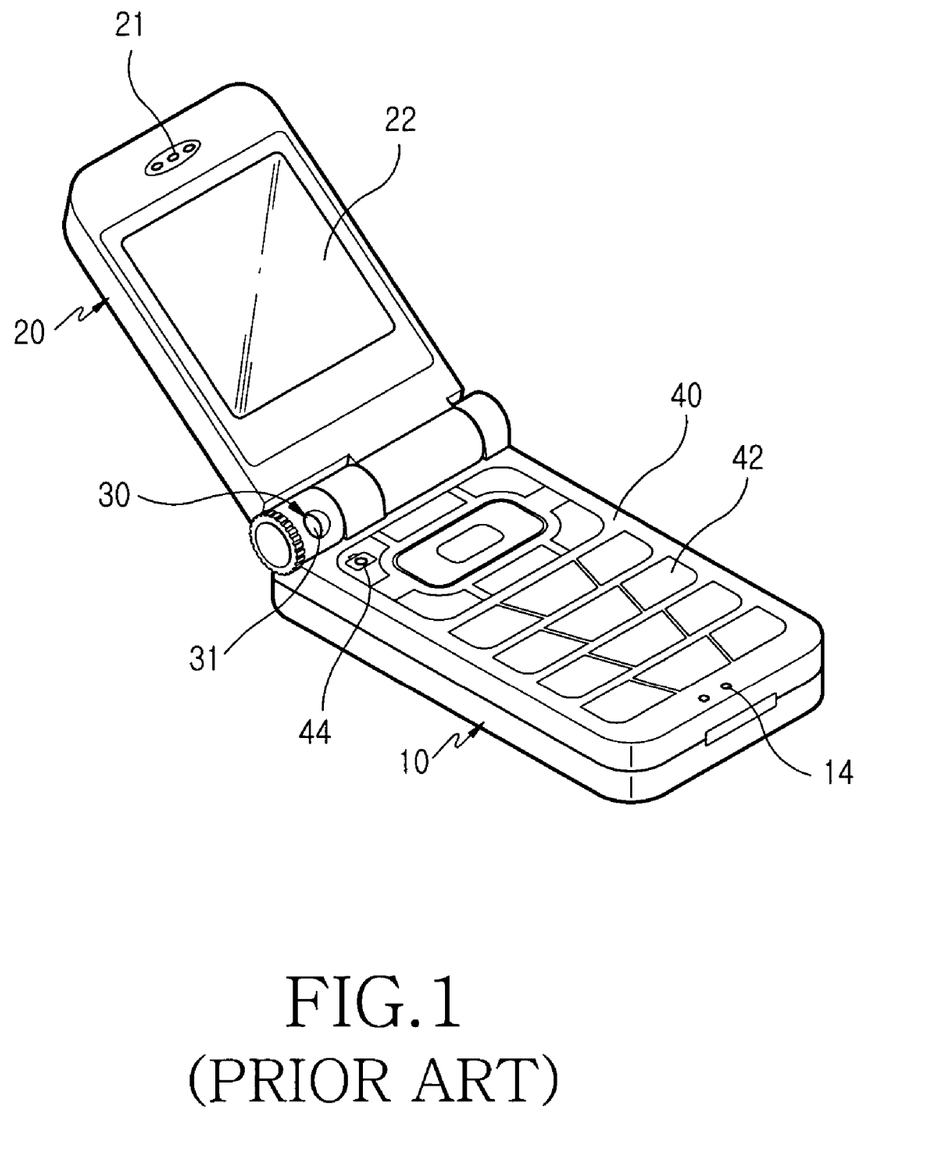
FIG. 1 shows an example of a general folder-type mobile terminal.

FIG. 1 shows an example of a general folder-type mobile terminal. The terminal has two housings rotatably connected by a hinge. The two housings are hereinafter referred to as a main housing 10 and a folder 20.

The mobile terminal as shown in FIG. 1 comprises a main housing 10, a folder 20, a hinge for rotatably connecting the folder 20 to the main housing 10 in such a manner that the folder 20 can move in a direction toward and away from the main housing 10 and for opening or closing the folder 10, and a lens housing 30 rotatably mounted on the hinge.

The main housing 10 includes a keypad 42 and a microphone 14 on the upper surface 40 thereof. The keypad 42 is provided with a plurality of keys.

The folder 20 includes a speaker 21 and a display device such as an LCD module 22. Also, the lens housing 30 includes a camera lens 31 and a known CCE (charge coupled device) or CMOS (complementary metal-oxide semiconductor) device (not shown) therein. The lens housing 30 is disposed coaxially in line with the hinge connecting the main housing 10 and the folder 20, thereby being capable of rotating along the axis of the hinge.

When a user of a mobile terminal wishes to obtain information about a particular object or sound, he or she may take a photograph of the object using the camera provided in the mobile terminal or record the sound of the object using the record function offered by the mobile terminal, and then obtain relevant information through the Internet. For example, when the user happens to see a chrysanthemum in bloom along the roadside and wishes to know what the flower is, he or she may photograph the flower using the camera provided in the mobile terminal. Without the knowledge about the photographed flower, the user may search for flowers having a shape similar or identical to the photographed flower through the Internet or the like. If the same flower is found, the user will then learn that the photographed flower is a chrysanthemums. The user may conduct additional searches for a chrysanthemum through the Internet and access a related server to request and obtain more detailed information about chrysanthemum. Finally, the user can learn the exact name and features of the flower found at the roadside.

A solution to a question about any text can be found by the same method.

However, it is a time-consuming process to take a photograph of an object and conduct a search for the object through books or Internet in order to obtain detailed information about the object. When seeing a particular object, people may wonder what the object is and wish to promptly satisfy their curiosity about the object. However, with current technology, they cannot obtain detailed information about the object immediately.

It is also troublesome to conduct searches for similar or identical objects and compare the found objects with that photographed on a one by one basis. Thus, the user may feel it is inconvenient and annoying to obtain detailed information about an object.

Moreover, there is a limitation to confirming with eyes whether any searched object is the same as the photographed object. Therefore, it is very difficult to obtain correct information about an object.

In order to satisfy any curiosity about a sound, the user may hear the sound recorded using the mobile terminal and compare the recorded sound with similar sounds obtained from the Internet. For example, if the user records a mooing sound of a cow, the user will remember the sound and compare it with sound information obtained from the Internet, thereby confirming the source of the recorded mooing sound and the features of the sound source. When a similar sound is found, the user may access a server providing the relevant information and learn that the sound source is a cow. The user may also obtain additional information about cow from the server.

As stated above, however, it is troublesome to undergo multiple processes to detect a particular sound source through Internet searches and obtain additional information about the sound source. In addition, it takes great amounts of time and effort to find the source of a particular sound by comparing the recorded sound with sound information obtained from the Internet or the like.

SUMMARY OF THE INVENTION

Accordingly, the present invention has been made to solve the above-mentioned problems occurring in the prior art, and one object of the present invention is to provide a method for correctly and rapidly searching for and providing detailed information about an object through a mobile terminal.

Another object of the present invention is to provide a method for searching for and obtaining detailed information about an object by a simple operation of a mobile terminal.

In order to accomplish these objects, there is provided a system for providing real-time information, which comprises: a mobile terminal for transmitting by radio a signal requesting detailed information about multimedia data and outputting detailed information received by radio in response to the request; a search system comprising an information database storing relevant information about multimedia data, checking whether any information in the information database matches multimedia data, about which detailed information has been requested, sending a signal requesting detailed information corresponding to the matching information, if any, and when the requested detailed information is received, transmitting the received detailed information to said mobile terminal; and at least one information providing server for collecting detailed information corresponding to the matching information upon receiving a signal requesting the detailed information from said search system, and sending the collected information to said search system.

According to the present information, when the user requests detailed information about an image or sound of an object using the mobile terminal, the search system extracts matching information by pattern-matching with respect to the image or sound about which detailed information was requested. Also, the search system receives detailed information corresponding to the matching information from the information providing server and transmits the detailed information to the mobile terminal. The present invention enables the user to rapidly and easily obtain detailed information about an image or a sound of an object in real time.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the drawings, the same element, although depicted in different drawings, will be designated by the same reference numeral or character. Although certain elements such as a circuit device are specifically defined in the following description of the present invention, it will be obvious to those skilled in the art that such definitions of elements are supplied to improve understanding of the present invention and that the present invention can be carried out without such specific elements. Also, in the following description of the present invention, a detailed description of known functions and configurations incorporated herein will be omitted when it may obscure the subject matter of the present invention.

Figure 2:
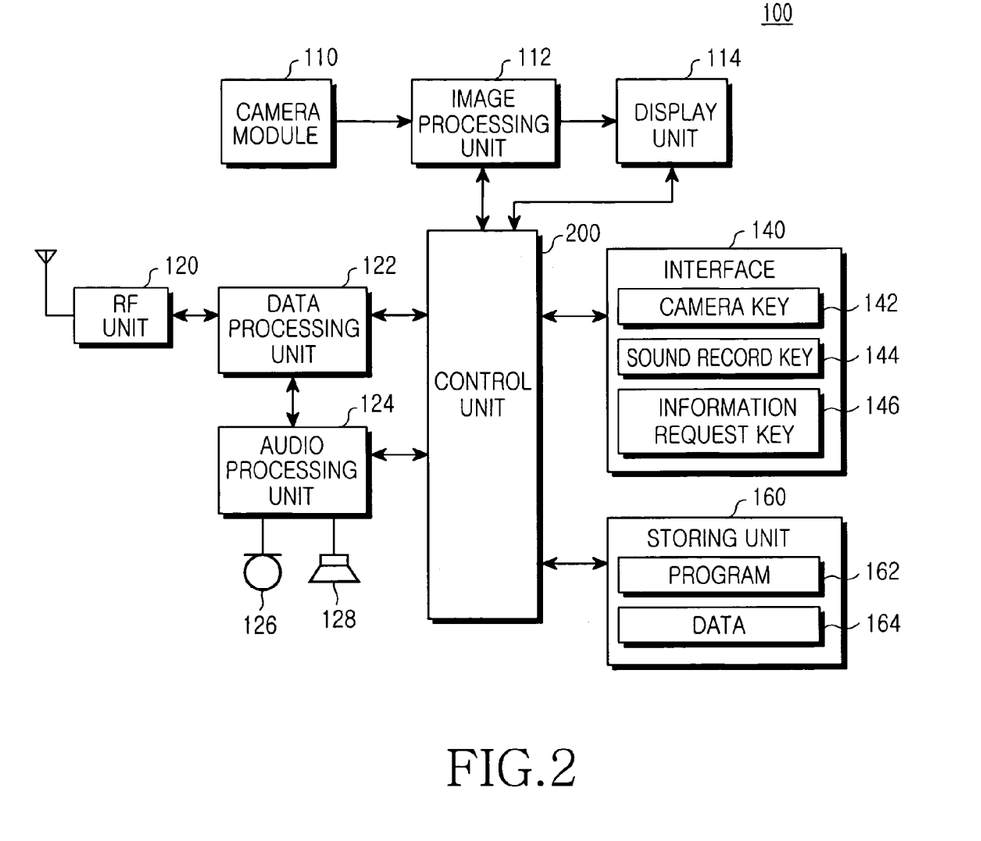
FIG. 2 is a block diagram of a preferred embodiment of a mobile terminal comprising a camera useful in requesting search information according to the present invention.

FIG. 2 is a block diagram of a preferred embodiment of a mobile terminal having a camera and other systems for requesting search information according to the present invention.

The mobile terminal comprises a camera module 110, an image processing section 112, a display section 114, an RF section 120, a data processing section 122, a sound or audio processing section 124, a control section 200, an interface 140 and a storing section 160.

The camera module 110 is used to take a photograph of an object on which its lens focuses. The camera module 110 comprises a camera sensor (not shown) for converting a photographed optical signal into an electric signal and a signal processor (not shown) for converting an analog image signal photographed by the camera sensor into digital data. Supposing that the camera sensor is a CCD (charge coupled device) sensor, the signal processor can be a DSP (digital signal processor). The camera sensor and the signal processor can be either integrated into a single element or separated as independent elements.

The image processing section 112 performs a function of generating display data for displaying an image signal outputted from the camera module 110. The image processing section 112 processes the image signal outputted from the camera module 110 in frames. Also, the image processing section 112 adjusts the frame image data to conform to the features, such as size and resolution, which are displayable on the display section 114, and outputs the adjusted frame image data. The image processing section 112 comprises an image codec, and compresses the frame image data displayed on the display section 114 in a preset manner or restore the compressed frame image data to the original frame image data. The image codec is selected from a variety of still or moving picture codecs, such as JPEG codec, MPEG4 codec or Wavelet codec. The image processing section 112 has an OSD (on screen display) function. According to the control of the control section 200, the image processing section 112 can combine image data with OSD data and output the combined data.

The display section 114 displays image data outputted from the image processing section or data outputted from the control section 200. The display section 114 may additionally comprise an LCD controller, a memory for storing image data and an LCD device. When the display section 114 is a touch screen, it can serve as an input section.

The RF section 120 comprises a RF transmitter (not shown) for performing upward conversion and amplification of the frequency of a signal which is being transmitted, and an RF receiver (not shown) for amplifying a signal, which is being received, with low noise and performing downward conversion of the frequency of the signal.

The data processing section 122 may be composed of a codec (coder/decoder) for encoding a signal transmitted from the RF section 120 or decoding a signal received by the RF section 120. The codec comprises a data codec for processing packet data and a sound codec for processing a sound signal such as a speech signal.

The sound processing section 124 reproduces a sound signal outputted from the sound codec of the data processing section 122 or transmits a sound signal generated from the microphone 126 to the sound codec of the data processing section 122. The sound signal inputted to the data processing section 122 from the sound processing section 124 is processed by the sound codec of the data processing section 122 and transmitted to the receiving part through the RF section 120.

Also, the sound signal processed by the data processing section 122 is sent to the control section 200. The control section 200 stores the sound signal received from the data processing section 122 in the storing section 160 or outputs the sound signal to the speaker 128 through the sound processing section 124.

The control section 200 controls the overall operation of the mobile terminal. The control section 200 according to this embodiment stores image data photographed by the camera module 110 and sound data received through the microphone 126, as well as image or sound data received by the RF section 120, in the storing section 160. Also, when a signal is input to request detailed information about image or sound data, the control section 200 sends a signal requesting detailed information about the image or sound data to a search system (see FIG. 3) according to the input signal. When the requested information is received from the search system, the control section 200 controls the display section 114 and the sound processing section 124 to display or output as sound the received information. At this time, the control section 200 can store the received information in the storing section 160.

The interface 140 provides a user interface which enables a user to select a command for controlling the operation of the mobile terminal. The interface 140 is generally provided with function keys for providing a shortcut means to easily perform functions of the mobile terminal and setting the mode of the mobile terminal, a send key for selecting on-line services using speech, written characters and the Internet, and number/character keys for inputting numbers or characters.

The interface 140 according to this embodiment is provided with a camera key 142, a speech record key 144 and an information request key 146. The camera key 142 is used to take a photograph using the camera module 110. Image data photographed by the camera module 110 is displayed on the display section 114 and stored in the storing section 160. The speech record key 144 is used to input a command to the control section 200 as to whether sound data received by the RF section 120 or received through the microphone 126 should be stored in the storing section 160. The information request key 146 is used to request that the search system should provide detailed information about the image or sound data.

When a selection signal is input by the information request key 146, the control section 200 sends a signal requesting detailed information about the image or sound data to the search system through the RF section 120 according to the inputselection signal.

The storing section 160 stores a program 162 and data 164. The program 162 includes a program for controlling the general operation of the mobile terminal and an application program necessary to provide real-time search information according to the present invention. The storing section 160 stores image data photographed by the camera module 110 and sound data recorded by the selection of the speech record key 144 as additional data 164.

Preferably, the data 164 of the storing section 160 should include classification information and/or keyword information about the image or sound data. The classification information classifies objects broadly or narrowly according to the categories, for example, into flowers, trees, birds, ceramic ware and so on. The keyword information can be set according to the categories in the same manner as the classification information is set, or to the features of image data.

For example, a user may take a photograph of a chrysanthemum without the knowledge of the flower. If the user wishes to know what the photographed flower is, he or she can input the information request key 146 provided in the mobile terminal to obtain detailed information about the photographed image data. Upon the input of the information request key 146, the mobile terminal will send a signal requesting detailed information about the photographed image data to the search system. Preferably, when such a signal is sent, classification information and/or keyword information about the image data will also be transmitted. In other words, a signal requesting detailed information about the photographed image data is sent to the search system, together with the classification information that the image data relates to a flower, thereby enabling the search system to more easily conduct a search for the image data.

Figure 3:
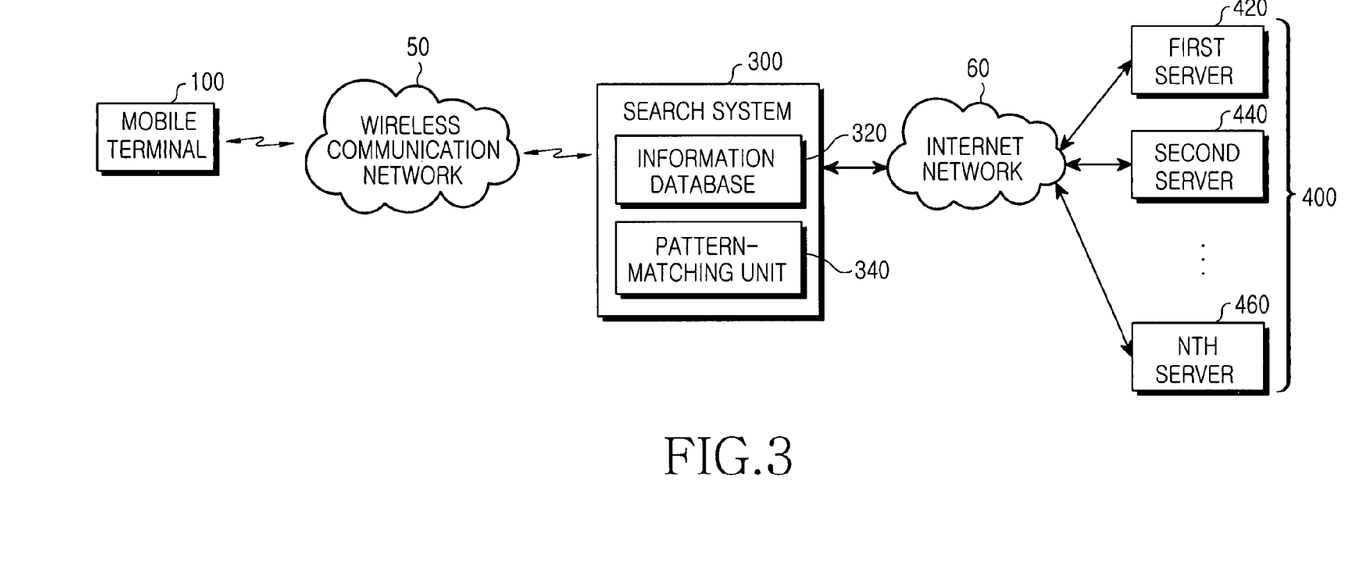
FIG. 3 is a block diagram of a preferred embodiment of a search information providing system using a mobile terminal according to the present invention.

FIG. 3 is a block diagram of a preferred embodiment of a search information providing system using a mobile terminal according to the present invention.

As shown in FIG. 3, the search information providing system comprises a mobile terminal 100 connected to a wireless communication network 50 to perform communications, a search system 300 having one side connected to the wireless communication network 50 and the other side connected to a wire communication network or the Internet network 60 to provide information requested from the mobile terminal 100 connected to the wireless communication network 50, and an information providing server 400 for providing detailed information requested from the search system 300 through the wire communication network or the Internet network 60.

The search system 300 has an information database 320 and a pattern-matching section 340. The information database 320 stores image information of objects, together with sounds which can be generated from each object. The image information includes various images of each object photographed at various angles and positions. In addition, the image information includes various images showing the changes of the object with lapse of time.

The pattern-matching section 340 compares image or sound data transmitted from the mobile terminal 100 with information stored in the information database 320 in order to determine whether the data matches the stored information. The pattern-matching section 340 primarily determines whether the information database 320 provides information identical to the transmitted data. If no identical information is available, the pattern-matching section 340 will then determine whether any information in the information database 320 is similar to the transmitted data within a predetermined range.

If the information database 320 includes information which matches the data transmitted from the mobile terminal 100, the search system 300 will request the information providing server 400 to provide detailed information about the image or sound, which corresponds to the matching information.

As shown in FIG. 3, the information providing server 400 may consist of a plurality of information providing servers 420, 440, . . . 460 to provide different information in each field. The search system 300 requests a server, which has the most sufficient and detailed information about the image or sound corresponding to the matching information, to provide the detailed information. One of the information providing servers 420, 440, . . . 460, which is requested to provide detailed information, collects information about the image or sound and sends the collected information to the search system 300.

The search system 300 transmits the detailed information received through the wire communication network or the Internet network 60 to the mobile terminal 100. At this time, the search system 300 may also send information matched by the pattern-matching section 340 (hereinafter "matching information"), among the information stored in the information database 320. From the matching information included in the detailed information displayed or outputted to the mobile terminal 100, the user can confirm whether the received detailed information relates exactly to the object article or sound.

Upon receiving requested detailed information through the wireless communication network 50, the mobile terminal 100 displays the received detailed information on the display section or outputs it through the speaker 128. The displayed or outputted detailed information can be stored in the storing section 160 under the control of the control section 200.

As described above, when the user requests detailed information about an object article or sound, matching information is extracted by pattern-matching for the object article or sound. Detailed information about the extracted matching information is then received from the information providing server 400 and transmitted to the mobile terminal 100. Accordingly, the user can rapidly and easily obtain detailed information about the object article or sound. Also, from the matching information received from the search system 300 together with the detailed information about the object article or sound, the user can confirm whether the received detailed information relates to the object article or sound.

Figure 4:
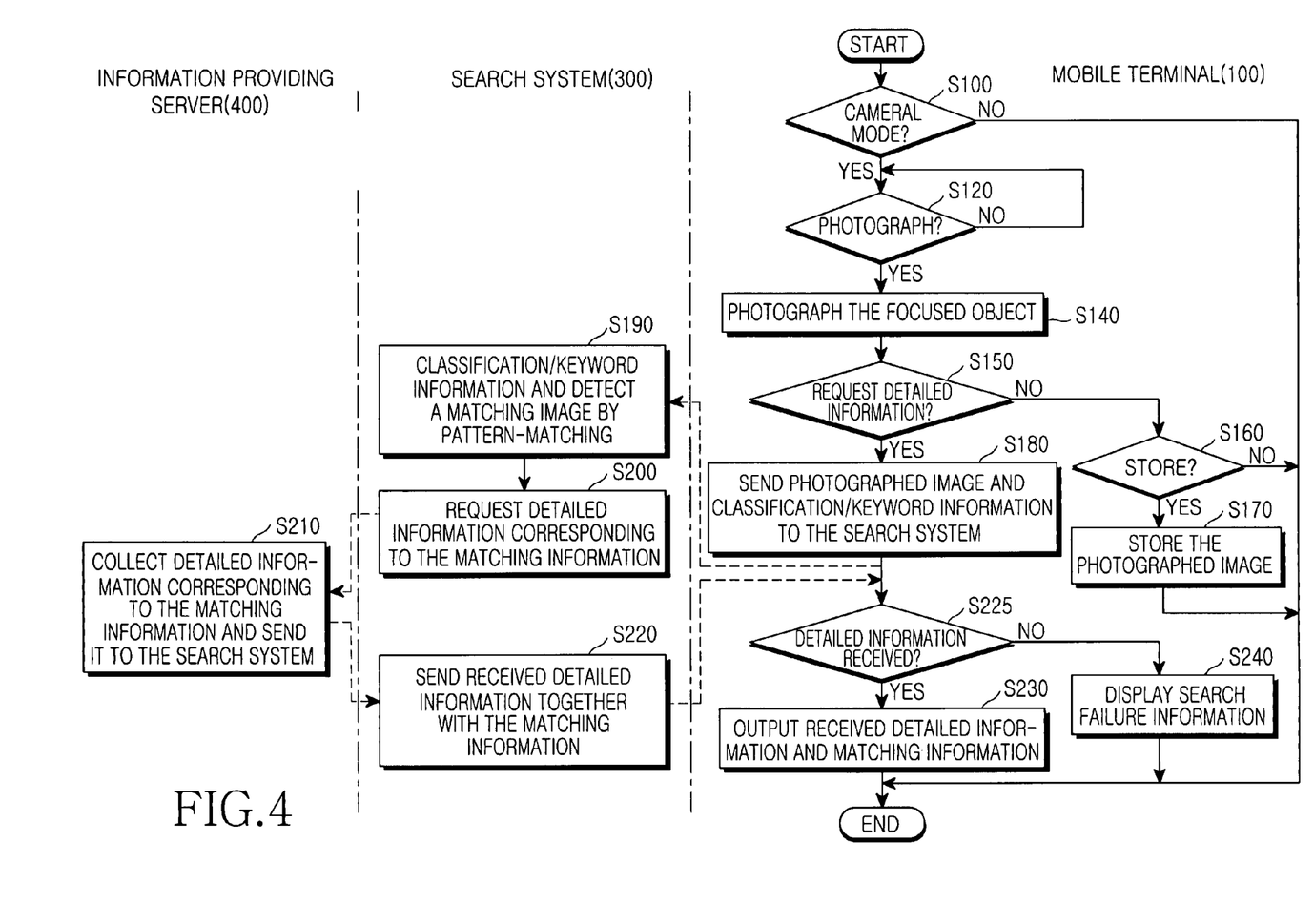
FIG. 4 is a flow chart showing a process of providing search information through a search information providing system using a mobile terminal according to a first embodiment of the present invention.

FIG. 4 is a flow chart showing a process of providing search information through a search information providing system using a mobile terminal according to the first embodiment of the present invention.

The control section 200 determines whether the operation mode of the mobile terminal 100 is a camera mode for photographing an object through the camera module 110 (S100).

If the mobile terminal 100 is determined to be in camera mode, the control section 200 will control the image processing section 112 and the display section 114 to display an image focused by the camera module 110. Also, the control section 200 will determine whether the camera key 142 provided in the interface 140 is inputted as a command to photograph the image displayed on the display section in camera mode (S120). Generally, when the camera key 142 is inputted again in camera mode of the mobile terminal 100, the control section 200 recognizes the second input as a command to photograph the image.

If it is determined that no command to photograph is inputted, the control section 200 will be on standby to take a photograph by controlling the display section 114 to display the image focused by the camera module 110, while maintaining the camera mode. If it is determined that a command to photograph is inputted, the control section 200 will take a photograph of the image focused by the camera module 110 and displayed on the display section 114 (S140). Also, the control section 200 will check an input of the information request key 146 in order to determine whether there is a request for detailed information about the object having the photographed image (S150).

If it is determined that there is no request for detailed information about the object having the photographed image, the control section will determine whether a selection signal is input by a storage command key (not shown) provided in the interface 140 to store the photographed image (S160). If it is determined that a storage command is inputted, the control section 200 will store the photographed image in the storing section (S170), else the process ends.

If the control section 200 determines that a signal is input to request detailed information about the object of the photographed image, it will send a signal requesting detailed information about the object, together with the photographed image, to the search system 300. Preferably, the control section 200 will also send the search system 300 the classification information and keyword information about the object, both of which are stored in the storing section 160. The classification information and the keyword information are selected and inputted by the user to be sent together with the photographed image to the search system 300.

The pattern-matching section 340 in step S190 determines whether the photographed image matches relevant information stored in the information database 320. Preferably, the pattern-matching section 340 compares the photographed image with the relevant image stored in the information database 320 to determine whether the two images match each other. By doing this, it is possible to more easily extract basic information ("matching information") about the object having the photographed image, such as the name of the object.

The operation of the pattern-matching section 340 for determining any pattern-matching between images is obvious to one skilled in the art. For example, the pattern-matching section 340 may extract image information, such as shape and color, corresponding to the received image of an object and compare the extracted information with that stored in the information database 320, thereby determining any pattern-matching between the received image and the stored information.

In case of a flower, shape information may include shapes of stem, leaf, petal and so on. The shape information may also include feature information of an object, such as the number and shape of leaves and those of petals.

Accordingly, the pattern-matching section 340 primarily determines the category of the object having the received image, based on the shape information. It secondarily determines exactly what the object is based on the feature information.

If an image that matches the object image is detected as a result of the pattern-matching, the search system 300 selects an appropriate server which has the most sufficient matching information, among the information providing servers 400. The search system 300 sends a signal requesting detailed information corresponding to the matching image (matching information) to the selected server (S200). This embodiment instances the second information providing server 440 as an appropriate server selected by the search system 300 to request detailed information corresponding to the matching information.

Upon receiving a signal requesting detailed information, the second information providing server 440 collects detailed information as requested and sends the collected information to the search system 300 (S210). The search system 300 receives the detailed information from the second information providing server 440 and sends the same to the mobile terminal 100 (S220). Preferably, the search system 300 may include the matching information extracted by the pattern-matching (S190) in the detailed information to be sent to the mobile terminal 100.

The mobile terminal 100 determines whether detailed information about the photographed image has been received (S225). When receiving the detailed information from the search system 300, the mobile terminal 100 displays the received detailed information on the display section and/or outputs it through the speaker 128 (S230). If the matching information is received together with the detailed information, the mobile terminal 100 will display the matching information and/or outputs it through the speaker 128 so that the user can confirm whether the matching information relates exactly to the object image. If the user determines that the matching information does not relate to the object image, he or she can edit or correct the classification information and keyword information about the object and request detailed information about the object again.

At step 225, if it is determined that detailed information has not been received, the mobile terminal 100 will display and/or output the search failure information (S240).

The search system 300, which is described in this embodiment, can be a base station for controlling the wireless communication network of the mobile terminal 100.

When requested to provide detailed information about a photographed image, the search system 300 extracts an image that matches the photographed one from the stored information and sends a signal requesting detailed information about the extracted matching image to an appropriate server. Accordingly, the user can easily and rapidly receive detailed information about an object from the server in real time.

Although this embodiment explains that the mobile terminal 100 receives detailed information corresponding to the matching information obtained by pattern-matching between a photographed image and stored images, it is also possible to obtain detailed information about a photographed text by pattern-matching according to the present invention.

Figure 5:
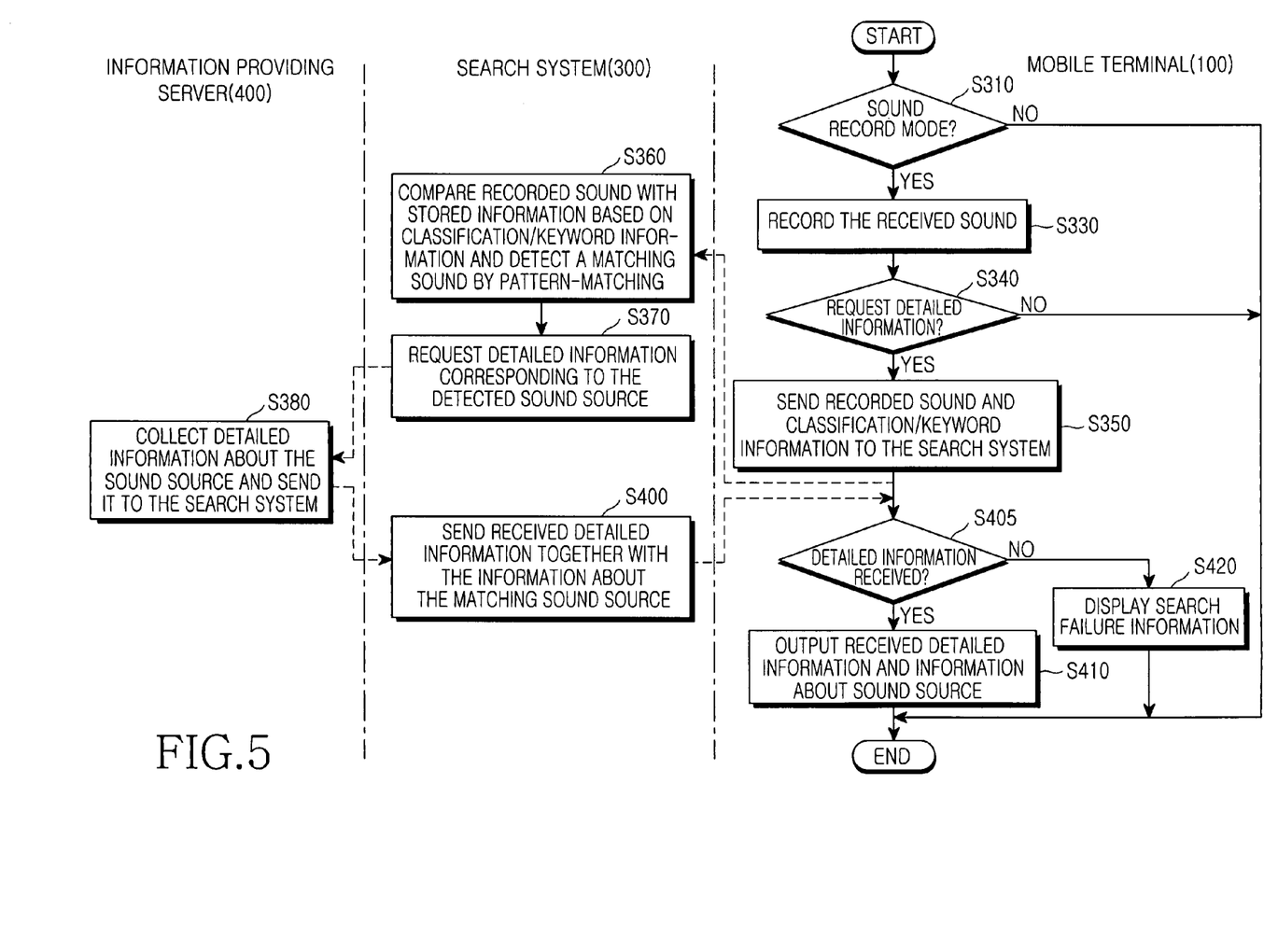
FIG. 5 is a flow chart showing a process of providing search information through a search information providing system using a mobile terminal according to a second embodiment of the present invention.

FIG. 5 is a flow chart showing a process of providing search information through a search information providing system using a mobile terminal according to the second embodiment of the present invention.

The control section 200 determines whether the operation mode of the mobile terminal 100 is a sound record mode for recording at least one of a sound received through the microphone 126, a sound received by the RF section 120 or a sound stored in the storing section 160 (S310). Although this embodiment will explain a sound received through the microphone 126 as an example, it can be applied to any sounds reproducible through other paths.

If it is determined that the mobile terminal 100 is in sound record mode, the control section 200 will record the sound received through the microphone 126 in the storing section 160 (S330). The control section 200 will also determine whether the information request key 146 is pressed to input a signal requesting detailed information about the recorded sound (S340). If it is determined that the information request key 146 is pressed, the control section 200 will send the recorded sound and a signal requesting detailed information about the sound to the search system 300 (S350). Preferably, if the classification information and keyword information about the sound are selected from the information stored in the storing section 180, the control section 200 will also send the selected classification and keyword information to the search system 300, together with the recorded sound.

Upon receiving a signal requesting detailed information about the sound, the pattern-matching section 340 of the search system 300 compares the received sound with sound information stored in the information database 320 and detects a sound having a pattern that matches the received sound (S360). If the classification information and the keyword information are included in the signal requesting detailed information, the pattern-matching section 340 will compare the received sound with the sound information stored in the information database 320 based on the classification information and the keyword information. By doing this, the pattern-matching section 340 can more easily detect a sound having a pattern that matches the recorded sound. If a matching sound is detected, the search system 300 will detect a source of the matching sound.

The search system 300 sends a signal requesting detailed information about the detected sound source to an appropriate server which appears to have the most sufficient information about the source, among the information providing servers 400 (S370). This embodiment instances the first information providing server 420 as an appropriate server having the most sufficient information about the sound source. Accordingly, the search system 300 sends a signal requesting detailed information about the detected sound source to the first information providing server 420.

Upon receiving the signal, the first information providing server 420 collects detailed information about the sound source and sends the collected information to the search system 300 (S380). The search system 300 receives the detailed information from the first information providing server 420 and sends the same to the mobile terminal 100 (S400). At this time, the search system 300 may preferably include a matching sound extracted by the pattern-matching (S360) and information about the source of the matching sound in the detailed information about the sound source.

The mobile terminal 100 determines whether detailed information as requested has been received (S405). If it is determined that detailed information has not been received, the mobile terminal 100 will display and/or output the search failure information (S420).

If it is determined that detailed information has been received from the search system 300, the mobile terminal 100 will display the received detailed information on the display section and/or output it through the speaker 128 (S410). If a matching sound and information about the sound source are received together with the detailed information, the mobile terminal 100 will output the matching sound and display and/or output the information about the source of the matching sound when displaying and/or outputting the detailed information. Therefore, the user can learn the source of the recorded sound and the sounds that can be produced from the source. In other words, the user can confirm whether the received detailed information relates exactly to the recorded sound.

In the embodiments explained above, an image or a text photographed or a sound recorded using a mobile terminal is transmitted to the search system 300 to request and obtain detailed information about the image, text or sound. These embodiments can be equally applied to any image, text or sound stored in the mobile terminal the mobile terminal 100. In another embodiment of the present invention, it is possible to extract an image, text or sound stored in the storing section 160 and send a signal requesting detailed information about the extracted image, text or sound to the search system 300, thereby obtaining the requested detailed information. Further, the image can be either a still image or a moving image (moving picture). The image, text and sound data can be commonly called "multimedia data".

According to the present invention, when a user requests detailed information about an image or sound of an object through a mobile terminal, the search system extracts matching information by pattern-matching between the object image or sound with the stored information, receives detailed information corresponding to the matching information from an information providing server and sends the detailed information to the mobile terminal. Thus, the user can rapidly and easily obtain detailed information about the object image or sound in real time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for providing real-time search information, comprising:
   a mobile terminal for transmitting a request for detailed information about multimedia data and outputting detailed information received in response to the request;
   a search system having an information database for storing relevant information about multimedia data, determining if information in the information database matches multimedia data, about which detailed information has been requested, requesting detailed information corresponding to the matching information, if any, and when the requested detailed information is received, transmitting the received detailed information to said mobile terminal; and
   a plurality of information providing servers for collecting detailed information corresponding to the matching information upon receiving a request for the detailed information from said search system, and sending the collected information to said search system.

2. The system according to claim 1, wherein said mobile terminal sends at least one of classification information and keyword information, when sending to said search system a 1 request for detailed information about the multimedia data.

3. The system according to claim 2, wherein said multimedia data includes at least one of image, sound and text information.

4. The system according to claim 3, wherein said image information stored in said information database includes a plurality of images of an object photographed at various angles and positions.

5. The system according to claim 4, wherein said image information stored in said information database includes a plurality of images of an object which show the changes of the object with lapse of time.

6. The system according to claim 1, wherein said search system is a base station.

7. The system according to claim 1, wherein said search system sends a request for detailed information corresponding to said matching information to a server which has the most sufficient matching information, among said plurality of information providing servers.

8. The system according to claim 1, wherein said search system sends the detailed information received from at least one of the plurality of information providing servers to said mobile terminal, together with said matching information.

9. A method for providing real-time search information from a system for providing real-time search information having a mobile terminal, a search system for managing a wireless communication network for communication through the mobile terminal, and an information providing server for collecting information requested from the search system and providing the collected information to the search system, said method comprising the steps of:

a) requesting detailed information about multimedia data;

b) comparing said multimedia data with relevant information stored in an information database of said search system and determining if information in the information database matches said multimedia data;

c) when said search system detects matching information, sending a request for detailed information corresponding to the matching information;

d) when an information providing server receives a request for detailed information, collecting detailed information corresponding to the matching information and sending the collected detailed information to said search system;

e) when the detailed information corresponding to the matching information is received from said information providing server, sending the received detailed information to said mobile terminal; and f) when said mobile terminal receives the requested detailed information, outputting the detailed information.

10. The method according to claim 9, wherein step a) further comprises the step of sending at least one of classification information and keyword information, when sending a request for detailed information about the multimedia data to said search system.

11. The method according to claim 10, wherein said multimedia data includes at least one of image, sound and text information.

12. The method according to claim 11, wherein said image information stored in said information database includes a plurality of images of an object photographed at various angles and positions.

13. The method according to claim 12, wherein said image information stored in said information database includes a plurality of images of an object which show the changes of the object with lapse of time.

14. The method according to claim 9, wherein said search system is a base station.

15. The method according to claim 9, wherein said information providing server consists of a plurality of information providing servers, and step c) further comprises the step of sending a request for detailed information corresponding to said matching information to a server having the greatest amount of matching information, among said plurality of information providing servers.

16. The method according to claim 9, wherein step e) further comprises the step of sending the detailed information received from one information providing server to said mobile terminal, together with said matching information detected at step b).

* * * * *